United States Patent
Jubert et al.

(10) Patent No.: US 11,869,556 B2
(45) Date of Patent: *Jan. 9, 2024

(54) HEAT-ASSISTED MAGNETIC RECORDING (HAMR) MEDIUM WITH OPTICAL-COUPLING MULTILAYER BETWEEN THE RECORDING LAYER AND HEAT-SINK LAYER

(71) Applicant: Western Digital Technologies, Inc., San Jose, CA (US)

(72) Inventors: Pierre-Olivier Jubert, San Jose, CA (US); Paul Christopher Dorsey, Los Altos, CA (US); Hoan Cong Ho, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,374

(22) Filed: Aug. 29, 2022

(65) Prior Publication Data

US 2023/0048634 A1    Feb. 16, 2023

Related U.S. Application Data

(63) Continuation of application No. 17/395,820, filed on Aug. 6, 2021, now Pat. No. 11,437,064.

(51) Int. Cl.
*G11B 5/65* (2006.01)
*G11B 5/706* (2006.01)
(Continued)

(52) U.S. Cl.
CPC ........ *G11B 5/70621* (2013.01); *G11B 5/1278* (2013.01); *G11B 5/653* (2013.01);
(Continued)

(58) Field of Classification Search
None
See application file for complete search history.

(56) References Cited

U.S. PATENT DOCUMENTS 6,579,590 B2    6/2003   Ju et al.
8,576,672 B1   11/2013   Peng et al.
(Continued)

OTHER PUBLICATIONS

Weller et al., "Review Article: FePt heat assisted magnetic recording media", J. Vac. Sci. Technol. B 34(6), Nov./Dec. 2016.
(Continued)

*Primary Examiner* — Peter Vincent Agustin
(74) *Attorney, Agent, or Firm* — PATTERSON + SHERIDAN, LLP; Steven H. VerSteeg (57) ABSTRACT

A heat-assisted magnetic recording (HAMR) disk has a magnetic recording layer (typically a FePt chemically-ordered alloy), a seed-thermal barrier layer (typically MgO) below the recording layer, a heat-sink layer, and an optical-coupling multilayer of alternating plasmonic and non-plasmonic materials between the heat-sink layer and the seed-thermal barrier layer. Unlike a heat sink layer, the multilayer has very low in-plane and out-of-plane thermal conductivity and thus does not function as a heat sink layer. The multilayer's low thermal conductivity allows the multilayer to also function as a thermal barrier. Due to the plasmonic materials in the multilayer it provides excellent optical coupling with the near-field transducer (NFT) of the HAMR disk drive.

20 Claims, 7 Drawing Sheets

(51) Int. Cl.
   *G11B 5/73* (2006.01)
   *G11B 5/127* (2006.01)
   *G11B 5/66* (2006.01)
   *G11B 7/1387* (2012.01)
   *G11B 5/82* (2006.01)
   *G11B 5/00* (2006.01)

(52) U.S. Cl.
   CPC ............ *G11B 5/672* (2021.05); *G11B 5/7369* (2019.05); *G11B 5/7375* (2019.05); *G11B 5/82* (2013.01); *G11B 7/1387* (2013.01); *G11B 2005/0021* (2013.01)

(56) References Cited

U.S. PATENT DOCUMENTS

| | | | |
|---|---|---|---|
| 8,605,555 | B1 | 12/2013 | Chernyshov et al. |
| 8,765,273 | B1 | 7/2014 | Kubota et al. |
| 9,443,545 | B2 | 9/2016 | Mosendz et al. |
| 9,530,445 | B1* | 12/2016 | Grobis ................ G11B 5/7375 |
| 9,558,777 | B2 | 1/2017 | Hellwig et al. |
| 9,697,859 | B1* | 7/2017 | Tripathy ............ G11B 5/73919 |
| 9,779,771 | B1* | 10/2017 | Wang ...................... G11B 5/72 |
| 9,822,441 | B2 | 11/2017 | Liu et al. |
| 9,824,710 | B1* | 11/2017 | Yuan ...................... G11B 5/65 |
| 9,916,868 | B1* | 3/2018 | Wang ...................... G11B 27/36 |
| 9,940,953 | B1* | 4/2018 | Zavaliche ............... G11B 5/40 |
| 10,109,309 | B1* | 10/2018 | Jubert ................. G11B 5/7369 |
| 10,236,026 | B1* | 3/2019 | Zhang ..................... G11B 5/737 |
| 10,276,199 | B1* | 4/2019 | Ho ..................... G11B 5/59661 |
| 10,276,202 | B1 | 4/2019 | Jubert et al. |
| 10,650,854 | B1 | 5/2020 | Yuan et al. |
| 11,437,064 | B1* | 9/2022 | Jubert .................... G11B 5/672 |
| 2003/0096077 | A1* | 5/2003 | Ju ......................... C23C 14/185 |
| 2012/0045662 | A1* | 2/2012 | Zou ...................... G11B 5/3133 428/810 |
| 2015/0179204 | A1 | 6/2015 | Mosendz et al. |
| 2016/0064022 | A1* | 3/2016 | Thiele ...................... G11B 5/66 428/800 |
| 2023/0048634 | A1* | 2/2023 | Jubert ........................ G11B 5/82 |

OTHER PUBLICATIONS

Jubert wt al., "Optimizing the Optical and Thermal Design if Heat-Assisted Magnetic Recording Media", IEEE Transactions on Magnetics, vol. 53, No. 2, Feb. 2017, 3200109.

Challener et al., 'Heat-assisted magnetic recording by a near-field transducer with efficient optical energy transfer', Nature Photonics, Advance Online Publication, www.nature.com/, Published Online: Mar. 22, 2009, DOI: 10.1038/NPHOTON.2009.26.

Jubert et al., Anisotropic Heatsinks for Heat Assisted Magnetic Recording, IEEE Transactions on Magnetics (vol. 57, Issue: Feb. 2, 2021), DOI: 10.1109/TMAG.2020.3019802.

Weller et al., "A HAMR Media Technology Roadmap to an Areal Density of 4 Tb/in2", IEEE Transactions on Magnetics, vol. 50, No. 1, Jan. 2014, 3100108.

T. D. Trinh et al, "Temperature-Induced Near-Field Transducer Failure in Heat-Assisted Magnetic Recording," in IEEE Transactions on Magnetics, vol. 56, No. 6, pp. 1-4, Jun. 2020 (Date of Publication: Apr. 9, 2020).

International Search Report and Written Opinion for International Application No. PCT/US2022/027543 dated Sep. 15, 2022.

* cited by examiner

| RuAl/Au | TC$_{IP}$(W/mK) |
|---|---|
| glass/[RuAl(1nm)/Au(1nm)]x10/Au(2nm) | 17 |
| glass/[RuAl(1nm)/Au(1nm)]x4/Au(2nm) | 20 |
| glass/[RuAl(2nm)/Au(2nm)]x5/Au(2nm) | 19.5 |
| glass/[RuAl(2nm)/Au(2nm)]x2/Au(2nm) | 28 |

| RuAl/Rh | TC$_{IP}$(W/mK) |
|---|---|
| glass/[RuAl(1nm)/Rh(1nm)]x10/Rh(2nm) | 8 |
| glass/[RuAl(1nm)/Rh(1nm)]x4/Rh(2nm) | 11.5 |
| glass/[RuAl(2nm)/Rh(2nm)]x5/Rh(2nm) | 9.1 |
| glass/[RuAl(2nm)/Rh(2nm)]x2/Rh(2nm) | 11.4 |

HEAT-ASSISTED MAGNETIC RECORDING (HAMR) MEDIUM WITH OPTICAL-COUPLING MULTILAYER BETWEEN THE RECORDING LAYER AND HEAT-SINK LAYER

CROSS-REFERENCE TO RELATED APPLICATIONS

This application is a continuation of U.S. patent application Ser. No. 17/395,820, filed Aug. 6, 2021, which is herein incorporated by reference.

BACKGROUND

Field of the Invention

This invention relates generally to a perpendicular magnetic recording medium for use as a heat-assisted magnetic recording (HAMR) medium, and more particularly to a HAMR medium with improved optical and thermal properties.

DESCRIPTION OF THE RELATED ART

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus, a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

One type of proposed high-$K_u$ HAMR media with perpendicular magnetic anisotropy is an alloy of FePt (or CoPt) chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. To obtain the desired chemical ordering to the $L1_0$ phase, the FePt alloy needs to be annealed after deposition or deposited with the substrate maintained at high temperatures (e.g., about 500 to 700° C.).

The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. In HAMR media, a seed-thermal barrier layer like MgO is used to induce the desirable (001) texture to the FePt magnetic grains and influence their geometrical microstructure and to also act as a thermal barrier layer so that heat from the NFT is not dissipated too rapidly from the FePt recording layer. A heat-sink layer is located below the seed-thermal barrier layer to move heat laterally (in-plane) and then vertically (i.e., in the out-of-plane direction of the recording layer) down to the substrate so there will be less heat spreading laterally in the recording layer.

SUMMARY

Heat-sink layers selected from Au, Ag and Cu provide good thermal and optical properties for HAMR media. The high lateral (in-plane) thermal conductivity of Au, Ag and Cu allows for the heat to be moved laterally and then down vertically very quickly to the substrate. Also, Au, Ag and Cu are plasmonic materials. One definition of a plasmonic material is a metal or metal alloy that has an extinction coefficient k at least twice as great as the index of refraction n at the wavelength of interest. As such, plasmonic materials also provide excellent optical coupling with the NFT, which results in a confined heat source in the recording layer.

However, the incorporation of a thick Au, Ag, Cu plasmonic layer immediately below the seed-thermal barrier layer (typically MgO) is difficult. The recording layer needs to have the right granular structure and crystallographic orientation to achieve the desired magnetic properties. The recording layer is made of FePt $L1_0$ grains that are typically separated by thin oxide/nitride segregant materials and requires a high temperature deposition process. The recording layer also needs to have uniform thickness and be very smooth so the slider can be maintained just a few nanometers above the disk surface. However, Au, Ag and Cu films roughen significantly at high temperatures, and are also prone to inter-diffusion when heated. For this reason, an intermediate layer is required between the Au, Ag or Cu heat-sink layer and the seed-thermal barrier layer. But separating the heat-sink and recording layers by too large a distance is detrimental to the thermal and optical performance of the medium. For example, the optical benefits of plasmonic Au, Ag, Cu disappear when used under a 10 to 25 nm thick intermediate layer.

In embodiments of this invention, an optical-coupling multilayer of alternating plasmonic and non-plasmonic materials is located between the seed-thermal barrier layer and the heat-sink layer without the need for an intermediate layer. Alternatively, the multilayer may be located within the seed-thermal barrier layer. Unlike a heat sink layer, the multilayer has very low in-plane and out-of-plane thermal conductivity and thus does not function as a heat sink layer. For that reason, a separate layer of heat-sink material is required below the multilayer. The multilayer's low thermal conductivity allows the multilayer to also function as a thermal barrier. Due to the plasmonic materials in the multilayer it provides excellent optical coupling with the NFT. Because of the lamination the multilayer provides good stability upon annealing.

It is important that the HAMR medium has a high thermal gradient (TG) in the recording layer, meaning there is a sharp drop in temperature at the edges of the bits being recorded. Similarly, the required laser power (LP) to achieve an acceptable thermal gradient, which is largely determined by the optical and thermal properties of the layers below the recording layer, should be minimized to prolong the life of the NFT. The optical coupling multilayer in embodiments of this invention improves the ratio of TG/LP over HAMR media without a single plasmonic layer.

For a fuller understanding of the nature and advantages of the present invention, reference should be made to the following detailed description taken together with the accompanying figures.

DETAILED DESCRIPTION

Figure 1:
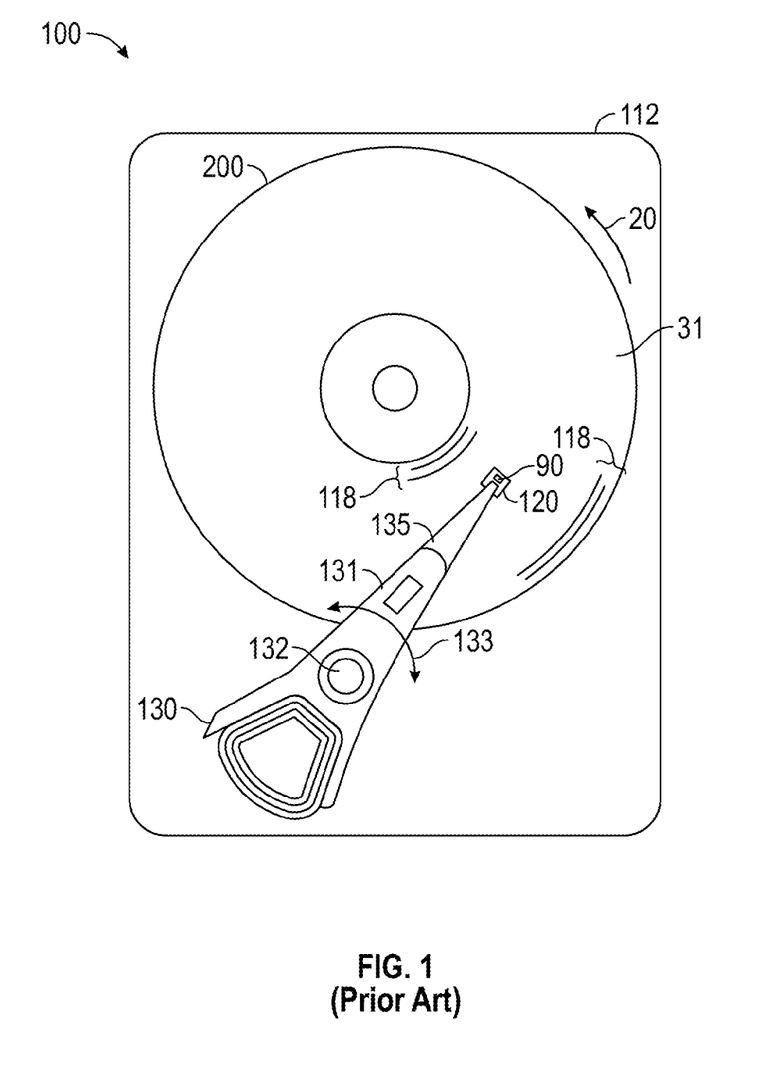
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the bearing of gas (typically air or helium) generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
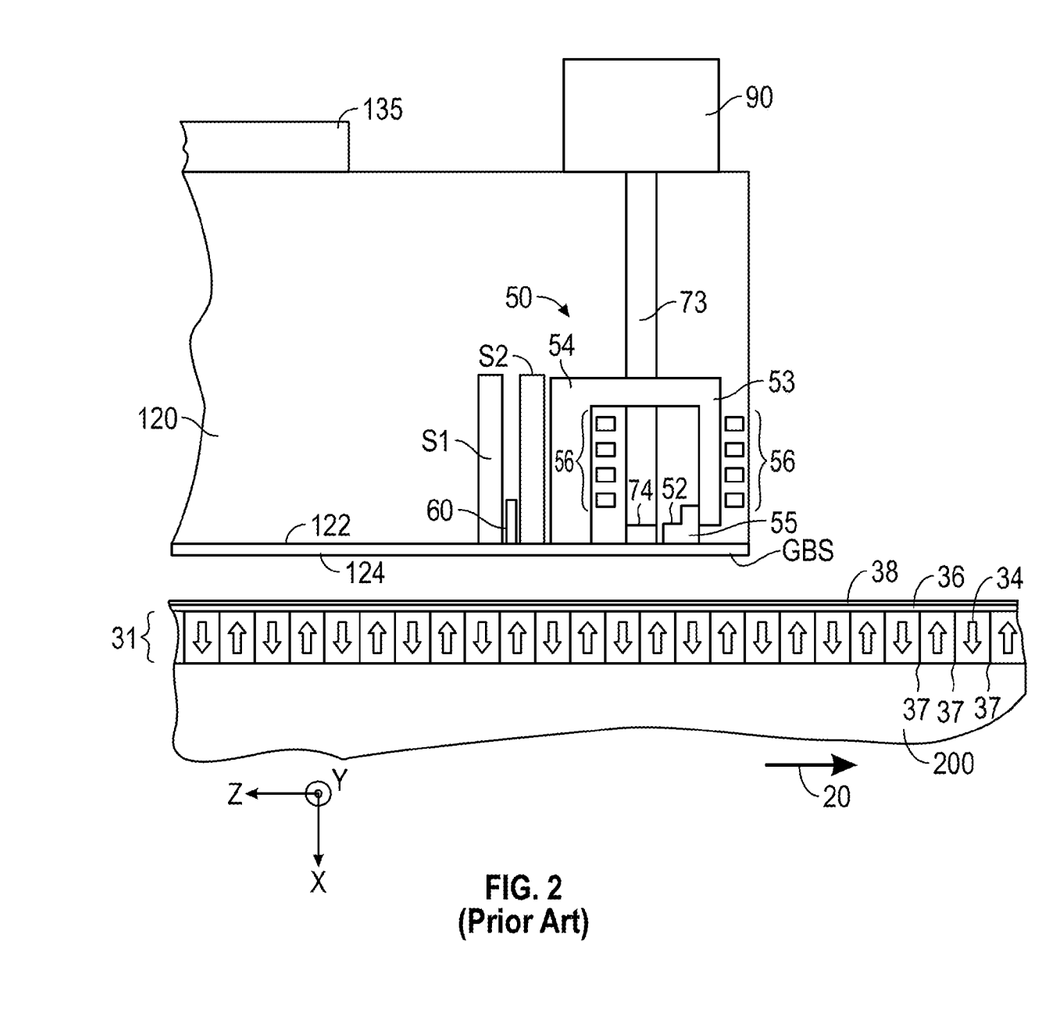
FIG. 2 depicts a sectional view, not drawn to scale because of the difficulty in showing the very small features, of a gas-bearing slider for use in HAMR disk drive and a portion of a HAMR disk according to the prior art.

In the following drawings, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating an example of a HAMR head according to the prior art, which is also capable of functioning as the HAMR head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The gas-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the GBS of the slider 120. An optional adhesion film or undercoat (not shown), such as a 1 to 5A silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. The metal structure of the NFT 74 can create resonant charge motion (surface plasmons) to further increase intensity and heating of the recording layer 31. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
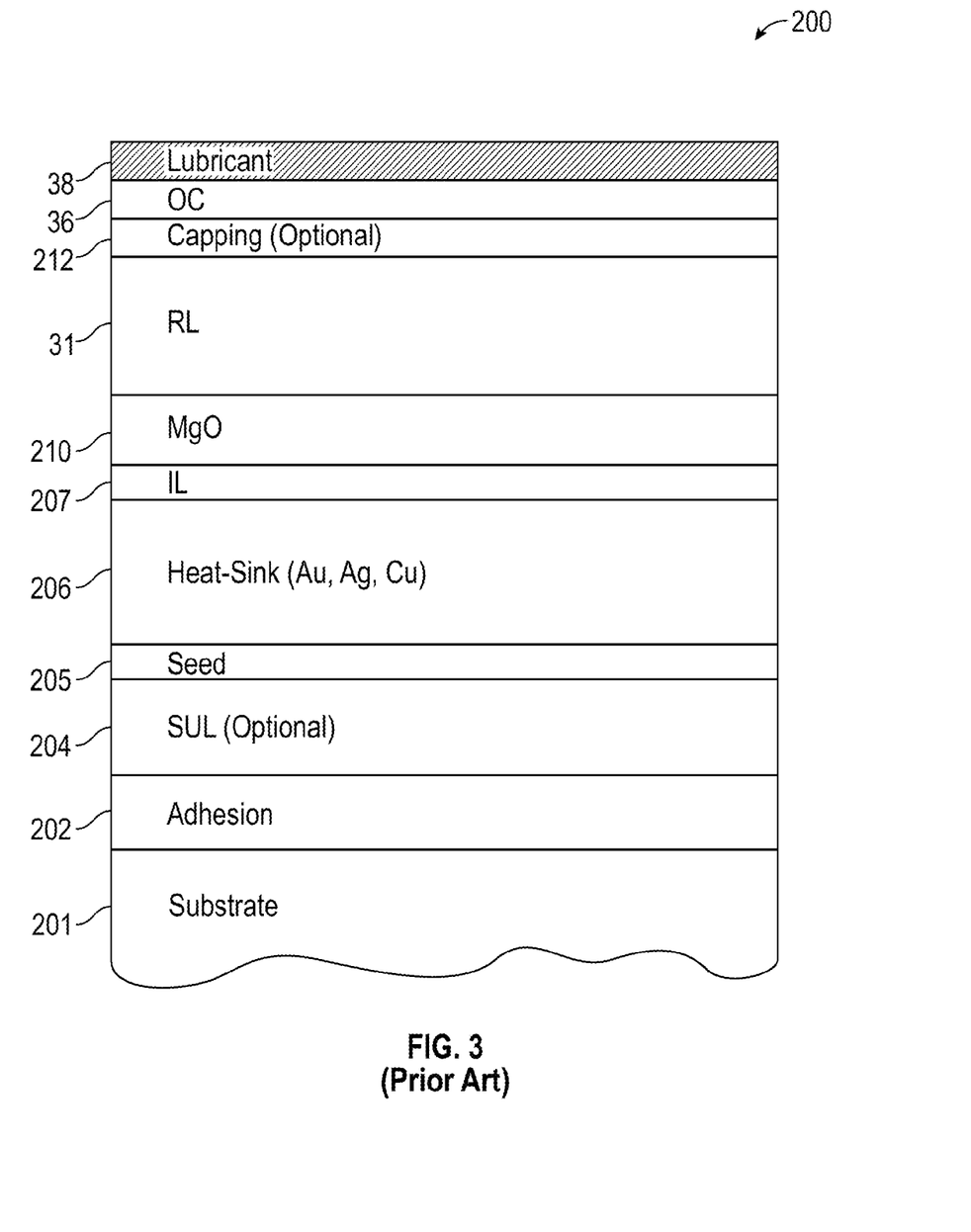
FIG. 3 is a sectional view showing a HAMR disk with a single plasmonic heat-sink layer of Au, Ag or Cu according to the prior art.

FIG. 3 is a sectional view showing HAMR disk 200 with a continuous granular recording layer (RL) 31 according to the prior art. The recording layer 31 may be comprised of a substantially chemically-ordered FePt alloy (or CoPt alloy) with or without segregants as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A heat-sink layer 206 is then deposited on seed layer 205. The heat-sink layer 206 facilitates the transfer of heat away from the RL to prevent spreading of heat to regions of the RL adjacent to where data is desired to be written, thus preventing overwriting of data in adjacent data tracks. The heat-sink layer 206 may be formed of plasmonic materials Au, Ag or Cu, which have high thermal conductivity and allow excellent coupling with the NFT, which results in a confined heat source. However, Au, Ag and Cu roughen significantly when annealed at high temperature. For this reason, the seed-thermal barrier layer 210 for the RL cannot be formed directly on the heat-sink layer 206. Thus, an intermediate layer (IL) 207 is required between the Au, Ag or Cu heat-sink layer 206 and the seed-thermal barrier layer 210. The seed-thermal barrier layer 210 is formed on the IL 207 and acts as both the seed layer for the RL 31 and a thermal barrier layer. The seed-thermal barrier layer 210 is typically MgO, but other materials have been proposed, including CrRu, CrMo, TiN and a mixture of MgO and $TiO_2$ (MTO) like $(Mg_{0.2}Ti_{0.8})O$. However, the IL 207 increases the distance between the RL 31 and the heat-sink layer 206, which reduces the optical and thermal performance of the heat-sink layer 206. U.S. Pat. No. 8,605,555 B1, which is assigned to the same assignee as this application, describes a HAMR medium with an amorphous IL like CrTi, CrTa or NiTa, between the heat-sink layer and the FePt RL to reduce the roughness caused by the heat-sink layer. U.S. Pat. No. 9,558,777 B2, which is assigned to the same assignee as this application, describes a HAMR medium with a heat-sink layer that may be formed from a long list of metals and alloys, including plasmonic Au, Ag, Cu and Rh, but requires an IL like amorphous NiTa between the heat-sink layer and the MgO seed layer. Heat-sink layers selected from non-plasmonic materials Cr, W, Mo and Ru have been proposed in place of Au, Ag or Cu because they do not roughen when annealed and thus may not require an intermediate layer. However, these materials provide less than optimal optical and thermal properties.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$-X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the HAMR media according to embodiments of the invention will be described with a FePt RL, embodiments of the invention are also fully applicable to media with a CoPt (or a pseudo-binary CoPt-X alloy based on the CoPt $L1_0$ phase) RL.

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus in the HAMR media, the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1, which is assigned to the same assignee as this application.

The FePt RL is sputter deposited, typically to a thickness of between about 4 to 15 nm, while the disk substrate 201 is maintained at an elevated temperature, for example between about 500 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluoropolyether (PFPE), is coated on OC 36.

Figure 4:
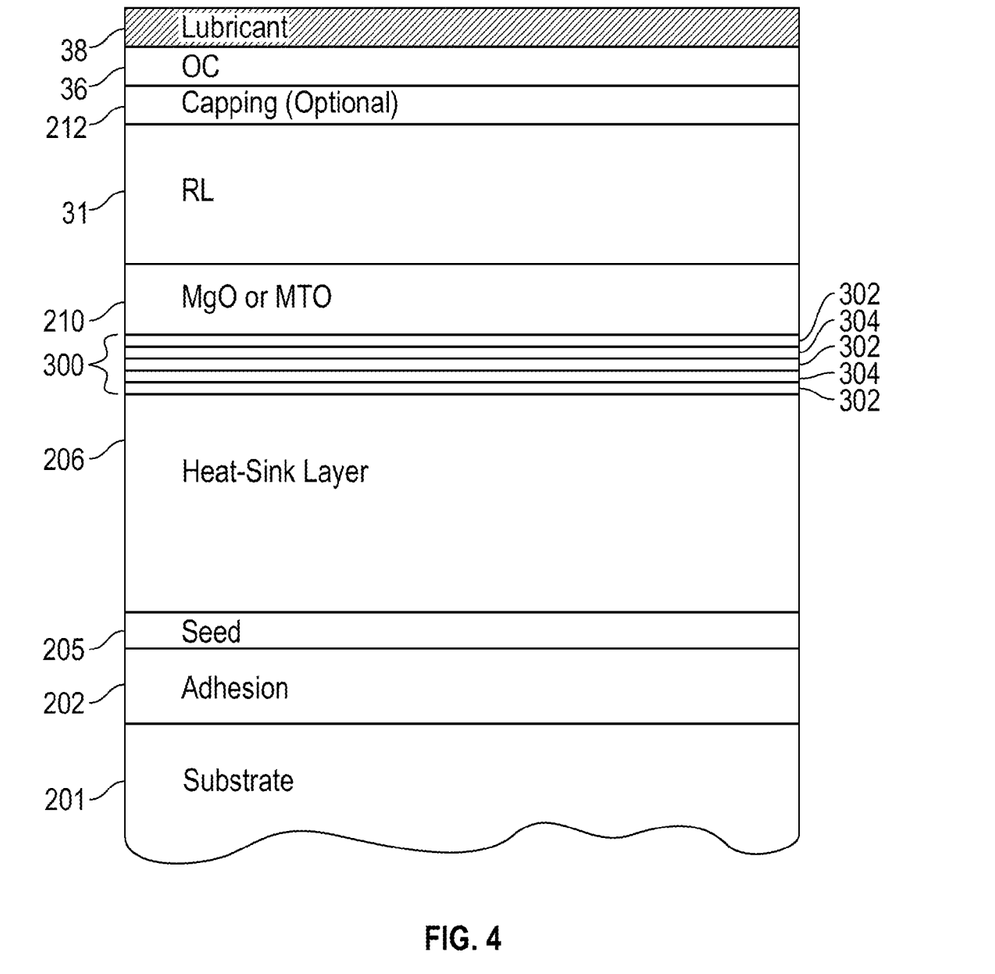
FIG. 4 is a sectional view showing a HAMR disk according to an embodiment of the invention.

FIG. 4 is a sectional view of a HAMR disk according to an embodiment of the invention showing the optical coupling multilayer 300 between the seed-thermal barrier layer 210 and the heat-sink layer 206. In FIG. 4 the optional SUL layer is omitted. The seed-thermal barrier layer 210 is preferably MgO or MTO. The multilayer 300 comprises alternating layers of a non-plasmonic material 302 and plasmonic material 304. Each layer 302, 304 has a thickness in the range of 0.5-2 nm and the total thickness of the multilayer 300 is preferably in the range of 3-20 nm.

Figure 5:
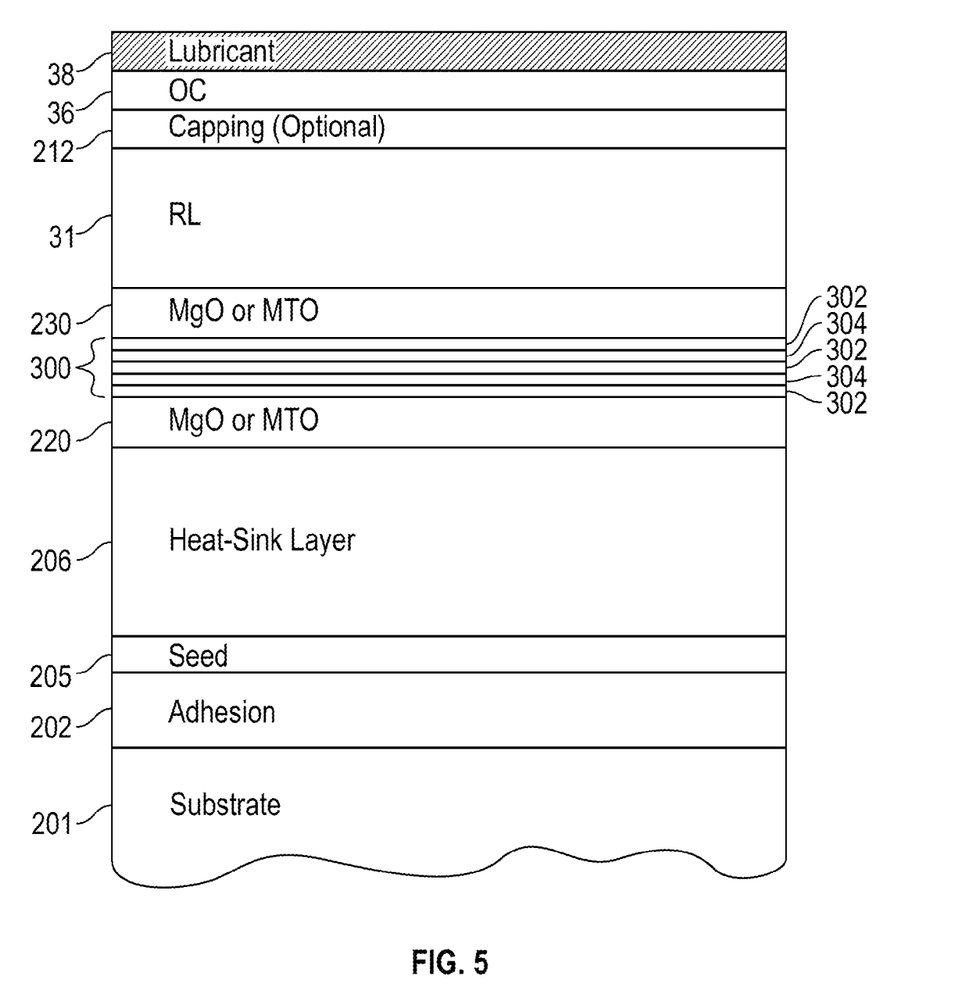
FIG. 5 is a sectional view showing a HAMR disk according to another embodiment of the invention.

FIG. 5 is a sectional view of a HAMR disk according to another embodiment of the invention showing the optical coupling multilayer 300 between a first seed-thermal barrier film 220 and a second seed-thermal barrier film 230. Each of films 220, 230 may be formed of MgO or MTO.

Table 1 below lists various metals and metal alloys that can be used for layers 302 and 304 with their corresponding n and k values at a wavelength of 830 nm. In addition, various metal nitrides like CrN, VN, WN, MoN may be suitable as non-plasmonic materials because they have a lattice constant like Au and Ag and exhibit low bulk thermal conductivity.

TABLE 1

|  | n | k |
|---|---|---|
| Plasmonic |  |  |
| Au | 0.1 | 5.3 |
| Ag | 0.1 | 5.0 |
| Cu | 0.3 | 5.3 |
| Rh | 2.8 | 7.0 |
| Non-plasmonic |  |  |
| $Ru_{50}Al_{50}$ | 4.3 | 4.4 |
| $Ni_{50}Ta_{50}$ | 3.9 | 4.0 |
| $Cr_{50}Ta_{50}$ | 4.3 | 4.4 |

Figure 6:
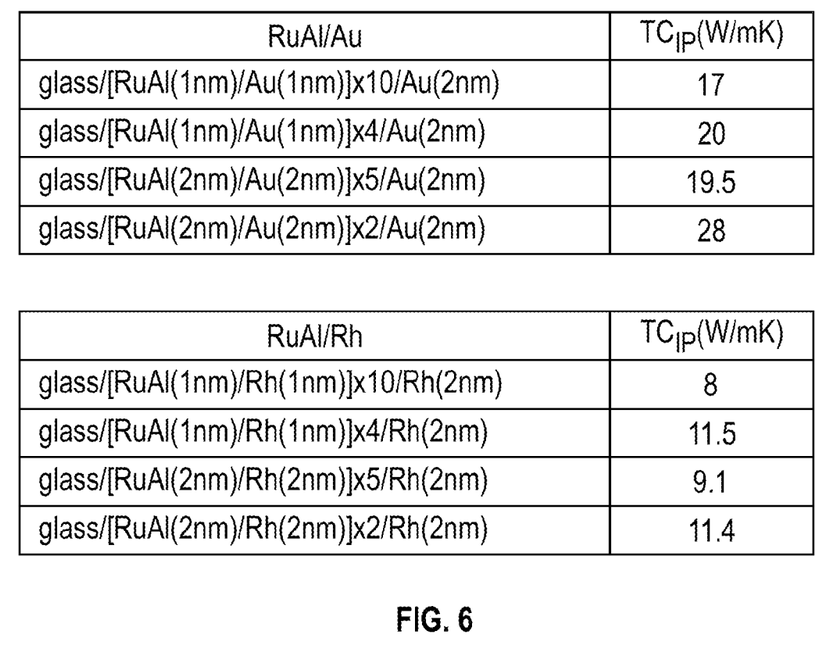
FIG. 6 is a table of the measured in-plane thermal conductivity ($TC_{IP}$) for RuAl/Au and RuAl/Rh multilayers of various thicknesses and number of repeats of the alternating layers formed on a glass substrate with a thin 2 nm Au or Rh cap to prevent oxidation of the multilayer.

The multilayer 300 is made of alternating thin plasmonic layers separated by thin non-plasmonic material. The thickness of each individual layer is small relative to each material's electron mean free path, which significantly lowers its thermal conductivity. As a result, the multilayer 300 has low in-plane thermal conductivity ($TC_{IP}$), preferably less than about 20 W/mK, and thus does not function as a heat-sink layer. For this reason, heat-sink layer 206 is required below multilayer 300 and may be formed of any of the known heat-sink materials including Cr, W, Mo, Ru, Rh, Au, Ag, or Cu and their alloys. However, Cr, W and Mo and their alloys are preferred because they do not roughen when annealed. FIG. 6 is a table that lists the measured $TC_{IP}$ for RuAl/Au and RuAl/Rh multilayers of various thicknesses and number of repeats of the alternating layers formed on a glass substrate with a thin 2 nm Au or Rh cap to prevent oxidation of the multilayer. The RuAl/Au multilayers exhibit $TC_{IP}$ around 20 W/mK. The RuAl/Rh multilayers exhibit $TC_{IP}$ around 10 W/mK. The multilayer 300 also has anisotropic thermal conductivities, i.e., the out-of-plane thermal conductivity ($TC_{OP}$) is lower than the $TC_{IP}$. This arises as heat carriers, electrons and/or phonons, encounter a lot of interfaces in the out-of-plane direction, which results in increased scattering and reduced conductivity. The interface thermal conductance between metals is typically in the range of 500 MW/m$^2$K to 4000 MW/m$^2$K depending on the materials and the quality of the interfaces. This results in multilayers having a $TC_{OP}$ in the range of 0.5 to 10 W/mK, depending on each interface thermal conductance and layer thicknesses. Based on $TC_{IP}$ measurements, $TC_{OP}$ is estimated around 10 W/mK for the RuAl/Au multilayers and between 5 and 10 W/mK for the RuAl/Rh multilayers. By comparison a conventional heat-sink material like Cr has a $TC_{IP}$ around 40-45 W/mK and a $TC_{OP}$ around 40-45 W/mK.

Figure 7:
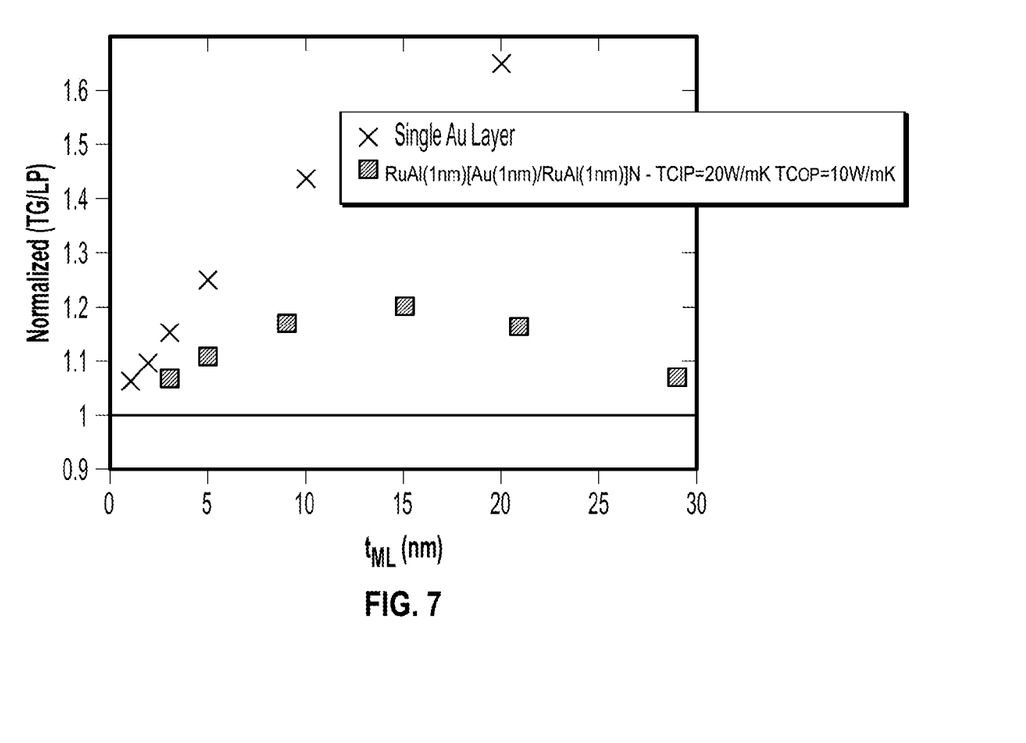
FIG. 7 shows graphical data for thermal gradient/laser power (TG/LP) from computer modeling for RuAl(1 nm)/Au(1 nm) multilayers of various thicknesses compared to a single Au plasmonic layer of various thicknesses.
Figure 8:
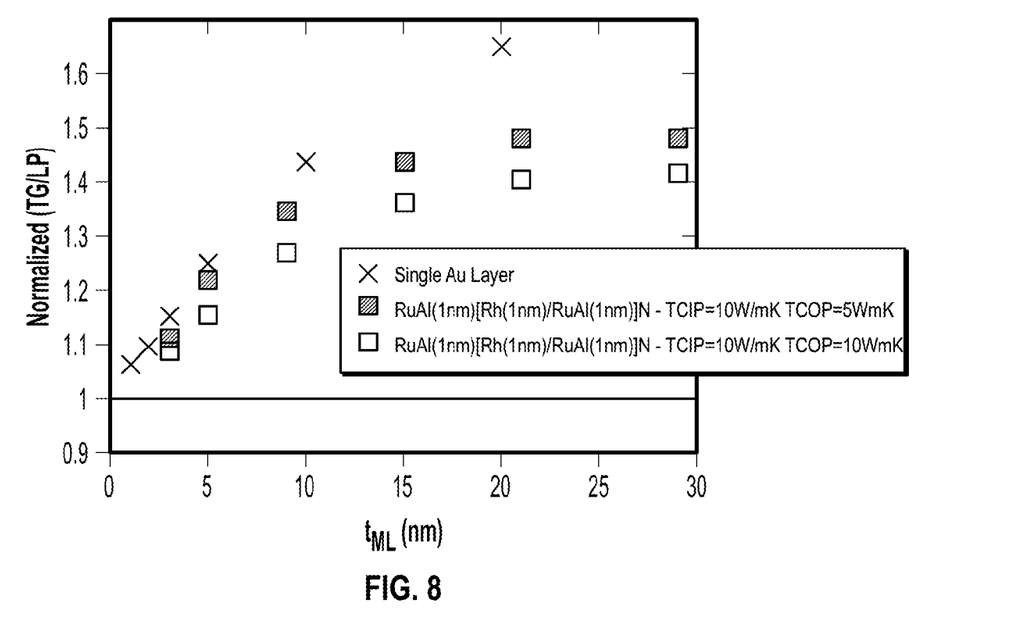
FIG. 8 shows graphical data for TG/LP from computer modeling for RuAl(1 nm)/Rh(1 nm) multilayers of various thicknesses compared to a single Au plasmonic layer of various thicknesses.

The optical performance of the HAMR medium stack can be modeled by the ratio of thermal gradient TG (change in temperature in the along-the-track direction) over the required laser power (LP) to write a 48-nm-wide track. The higher the ratio the better the optical efficiency of the medium. FIG. 7 shows graphical TG/LP data from computer modeling for RuAl(1 nm)/Au(1 nm) multilayers of various thicknesses with $TC_{IP}$=20 W/mK and $TC_{OP}$=10 W/mK compared to a single Au plasmonic layer of various thicknesses. The reference (TG/LP=1) is for a stack with no plasmonic layer below the seed-thermal barrier layer. The 3 nm thick multilayer is RuAl(1 nm)/Au(1 nm)/RuAl(1 nm) with the RuAl directly on the heat-sink layer and directly below the seed-thermal barrier layer. The 9 nm thick multilayer is 4 repeats of the 3 nm thick multilayer. FIG. 8 shows the same graphical TG/LP data from computer modeling as FIG. 7, but for RuAl(1 nm)/Rh(1 nm) multilayers for two cases, one where $TC_{IP}$=10 W/mK and $TC_{OP}$=5 W/mK and one where $TC_{IP}$=10 W/mK $TC_{OP}$=1 0W/mK.

The modeled data for both FIGS. 7 and 8 show the optical coupling provided by the multilayer, namely an improvement in TG/LP over the reference, with the improvement increasing with multilayer thickness (increased number of repeat laminations). Similar improvements in TG/LP have also been shown for modeled data for RuAl(2 nm)/Au(2 nm) and RuAl(2 nm)/Au(2 nm) multilayers of various thicknesses. As shown by FIGS. 7 and 8, TG/LP increases with increasing multilayer thickness, with the preferred range of thickness being between about 3-20 nm.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
   a substrate;
   a heat-sink layer;
   a magnetic recording layer;
   a seed-thermal barrier layer; and
   a multilayer comprising alternating layers of a plasmonic material and a non-plasmonic material, the multilayer being between the heat-sink layer and the seed-thermal barrier layer.

2. The medium of claim 1 wherein the plasmonic material is selected from Au, Ag, Cu and Rh.

3. The medium of claim 1 wherein the non-plasmonic material is selected from a RuAl alloy, a NiTa alloy, a CrTa alloy and a nitride of Cr, V, W or Mo.

4. The medium of claim 1 wherein each of the layers of plasmonic and non-plasmonic material has a thickness greater than or equal to 0.5 nm and less than or equal to 2 nm.

5. The medium of claim 1 wherein the multilayer has a thickness greater than or equal to 3 nm and less than or equal to 20 nm.

6. The medium of claim 1 wherein the heat-sink layer is formed of material selected from Cr, W, Mo and their alloys.

7. The medium of claim 1 wherein the seed-thermal barrier layer is selected from MgO and MTO.

8. The medium of claim 1 wherein a layer of non-plasmonic material in the multilayer is on and in contact with the heat-sink layer.

9. The medium of claim 1 wherein the magnetic recording layer further comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

10. The medium of claim 1 wherein the multilayer is on and in contact with the heat sink layer and the seed-thermal barrier layer is on and in contact with the multilayer.

11. The medium of claim 1 wherein the seed-thermal barrier layer comprises first and second films, wherein the multilayer is between the first and second films, the first film is on and in contact with the heat-sink layer, the second film is on and in contact with the multilayer, and the recording layer is on and in contact with the second film.

12. The medium of claim 11 wherein each of the first and second seed-thermal barrier layer films is selected from MgO and MTO.

13. The medium of claim 11 wherein the plasmonic material is selected from Au, Ag, Cu and Rh, and the non-plasmonic material is selected from a RuAl alloy, a NiTa alloy, a CrTa alloy and a nitride of Cr, V, W or Mo.

14. A heat assisted magnetic recording (HAMR) disk drive comprising:
   the medium according to claim 1 wherein said medium is a rotatable HAMR disk; and
   a carrier maintained near the magnetic recording layer of the disk and supporting a near-field transducer.

15. A heat-assisted magnetic recording (HAMR) disk comprising:
   a disk substrate;
   a heat-sink layer;
   a multilayer comprising alternating layers of a plasmonic material and a non-plasmonic material on the heat-sink layer;
   a seed-thermal barrier layer; and
   a magnetic recording layer, wherein the multilayer is disposed between the heat-sink layer and the seed-thermal barrier layer.

16. The disk of claim 15 wherein each of the layers of plasmonic and non-plasmonic material has a thickness greater than or equal to 0.5 nm and less than or equal to 2 nm and wherein the multilayer has a thickness greater than or equal to 3 nm and less than or equal to 20 nm.

17. A heat assisted magnetic recording (HAMR) disk drive comprising:
   the disk according to claim 15; and
   a gas-bearing slider maintained near the magnetic recording layer of the disk and supporting a near-field transducer.

18. A heat-assisted magnetic recording (HAMR) disk comprising:
   a disk substrate;
   a heat-sink layer;
   a first seed-thermal barrier film on the heat-sink layer;
   a multilayer comprising alternating layers of a plasmonic material and a non-plasmonic material on the first seed-thermal film;
   a second seed-thermal barrier film on and in contact with the multilayer; and
   a magnetic recording layer on and in contact with the second seed-thermal barrier film.

19. The disk of claim 18 wherein each of the layers of plasmonic and non-plasmonic material has a thickness greater than or equal to 0.5 nm and less than or equal to 2 nm and wherein the multilayer has a thickness greater than or equal to 3 nm and less than or equal to 15 nm.

20. A heat assisted magnetic recording (HAMR) disk drive comprising:
   the disk according to claim 18; and
   a gas-bearing slider maintained near the magnetic recording layer of the disk and supporting a near-field transducer.

* * * * *